United States Patent
Morikawa et al.

(10) Patent No.: US 8,242,208 B2
(45) Date of Patent: Aug. 14, 2012

(54) FLUORINE-CONTAINING POLYMER COMPOSITION AND CURED BODY

(75) Inventors: Tatsuya Morikawa, Osaka (JP); Manabu Fujisawa, Osaka (JP); Mitsuru Kishine, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 639 days.

(21) Appl. No.: 12/399,069

(22) Filed: Mar. 6, 2009

(65) Prior Publication Data

US 2009/0176953 A1 Jul. 9, 2009

Related U.S. Application Data

(62) Division of application No. 10/537,465, filed as application No. PCT/JP2003/015508 on Dec. 4, 2003, now Pat. No. 7,521,509.

(30) Foreign Application Priority Data

Dec. 5, 2002 (JP) ................................. 2002-354433

(51) Int. Cl.
*C08F 8/00* (2006.01)
(52) U.S. Cl. ..... 525/102; 525/104; 525/105; 525/326.2; 525/342
(58) Field of Classification Search ............. 525/102, 525/104, 105, 526.2, 342
See application file for complete search history.

(56) References Cited

U.S. PATENT DOCUMENTS

| | | | |
|---|---|---|---|
| 4,057,566 A * | 11/1977 | Carter et al. | 556/434 |
| 4,100,136 A * | 7/1978 | Carter et al. | 525/478 |
| 4,314,043 A * | 2/1982 | Kojima et al. | 525/102 |
| 5,480,938 A | 1/1996 | Badesha et al. | |
| 5,554,689 A * | 9/1996 | Langstein et al. | 525/102 |
| 6,127,504 A | 10/2000 | Fukuda et al. | |
| 6,297,339 B1 | 10/2001 | Osawa et al. | |
| 6,468,463 B1 | 10/2002 | Osawa | |
| 6,576,701 B2 | 6/2003 | Osawa et al. | |

FOREIGN PATENT DOCUMENTS

| | | |
|---|---|---|
| EP | 0 527 008 A1 | 2/1993 |
| EP | 527008 A1 * | 2/1993 |
| EP | 0 582 841 | 2/1994 |
| EP | 0 654 494 A1 | 5/1995 |
| EP | 0 926 182 A2 | 6/1999 |
| JP | 56-829 A1 | 1/1981 |
| JP | 56-28219 | 3/1981 |
| JP | 1-301725 | 12/1989 |
| JP | 5-70695 | 3/1993 |
| JP | 6-192524 | 7/1994 |
| JP | 7-188416 | 7/1995 |
| JP | 11-181288 | 7/1999 |
| JP | 2000-7835 | 1/2000 |
| JP | 2000-230091 | 8/2000 |
| JP | 2000-313034 | 11/2000 |
| JP | 2001-81131 | 3/2001 |
| JP | 2001-106893 | 4/2001 |
| JP | 2001-164115 | 6/2001 |
| JP | 2001-354764 | 12/2001 |
| JP | 2002-188003 | 7/2002 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

The invention provides a fluoropolymer composition capable of improving the characteristics of the cured material obtained therefrom. A fluoropolymer composition comprising a methylene group-containing fluoropolymer (A) and a hydrosilylation catalyst (B), wherein the methylene group-containing fluoropolymer (A) has methylene group-containing repeating units in the main chain thereof and is capable of hydrosilylation in the presence of the hydrosilylation catalyst (B) and one terminus of the chain is a carbon-carbon double bond or an Si—H group and the other terminus of the chain is an Si—H group or a carbon-carbon double bond.

1 Claim, No Drawings

FLUORINE-CONTAINING POLYMER COMPOSITION AND CURED BODY

CROSS REFERENCE TO RELATED APPLICATION

This application is a Divisional of U.S. patent application Ser. No. 10/537,465, which is a 371 of PCT Application No. PCT/JP2003/015508 filed Dec. 4, 2003 and which claims benefit of JPA No. 2002-354433 filed Dec. 5, 2002. The above-noted applications are incorporated herein by reference in their entirety.

TECHNICAL FIELD

The present invention relates to a fluoropolymer composition and to a cured material.

BACKGROUND ART

Fluororubbers are excellent in such characteristics as chemical resistance, solvent resistance and heat resistance and, therefore, they are widely used as sealants or like materials which can be used under severe conditions.

Known in the art is a curable fluoropolyether rubber composition containing a linear fluoropolyether compound having at least two alkenyl groups in each molecule and having a perfluoropolyether structure in the main chain thereof (cf. e.g. Japanese Kokai Publication 2001-354764). However, since the polymer in this composition has a main chain with a perfluoro structure, there arise problems; namely, the composition is poor in compatibility with materials or compounds other than perfluoro compounds and difficult to adhere to other materials or mix with other formulating ingredients or additives. Another problem is that an expensive dicarboxylic acid compound is required in synthesizing the polymer.

Also known is a curable composition comprising a fluorine-containing oligomer having an unsaturated group at each terminus of the main chain thereof and having a number average molecular weight of 1,000 to 10,000 and a (meth) acrylic monomer, together with a photopolymerization initiator or radical generator (cf. e.g. Japanese Kokai Publication 2001-81131). However, this composition has problems; namely, a UV irradiation apparatus is required for curing this curable composition using a photopolymerization initiator and, in the curing reaction of the curable composition using a radical generator, byproducts causing foaming are generated.

Therefore, a mixture comprising a lateral double bond-containing fluoroelastomer resulting from polymerization of a small amount of a monomer containing at least two olefinic double bond, for example triallyl isocyanurate, and an Si—H group-containing silicone elastomer and so forth, together with a specific catalyst, and which is to be cured by the hydrosilylation reaction has been proposed (cf. e.g. Japanese Kokai Publication H06-192524).

However, the cured material obtained from this mixture has problems about mechanical strength and other characteristics. Further, there is no disclosure or suggestion about the effect and so forth in connection with this fluoroelastomer having an olefinic double bond at a chain terminus.

SUMMARY OF THE INVENTION

In view of the above-discussed state of the art, it is an object of the present invention to provide a fluoropolymer composition capable of improving the characteristics of the cured material obtained therefrom.

The invention provides a fluoropolymer composition comprising a methylene group-containing fluoropolymer (A) and a hydrosilylation catalyst (B), wherein the methylene group-containing fluoropolymer (A) has methylene group-containing repeating units in the main chain thereof and is capable of hydrosilylation in the presence of the hydrosilylation catalyst (B) and one terminus of the chain is a carbon-carbon double bond or an Si—H group and the other terminus of the chain is an Si—H group or a carbon-carbon double bond.

In the following, the present invention is described in detail.

DETAILED DISCLOSURE OF THE INVENTION

The fluoropolymer composition of the invention comprises a methylene group-containing fluoropolymer (A) and a hydrosilylation catalyst (B).

The methylene group-containing fluoropolymer (A) is capable of hydrosilylation in the presence of the hydrosilylation catalyst (B).

The hydrosilylation so referred to herein is a reaction causing addition of an Si—H group to a carbon-carbon double bond. The term "Si—H group" as used herein means a group composed of a tetravalent silicon atom and one hydrogen atom bound to the silicon atom.

The methylene group-containing fluoropolymer (A) can be cured by the above-mentioned hydrosilylation. Since it can be cured, the methylene group-containing fluoropolymer (A) can be adequately used, for example, a rubber or a curable coating. The methylene group-containing fluoropolymer (A) is curable owing to its having a curing site.

The term "curing site" as used herein means a functional group or bond capable of being chemically modified by a curing type reaction. The "curing type reaction" so referred to herein includes, within the meaning thereof, a reaction forming a crosslinkage and a reaction consisting in mutual bonding of molecular chains of the methylene group-containing fluoropolymer (A) without forming any crosslinkage. The "reaction forming a crosslinkage" is sometimes referred to herein as "crosslinking", and the site in a molecule which is involved in the crosslinkage formation is sometimes referred to herein as "crosslinking site". The product of curing as obtained by subjecting the methylene group-containing fluoropolymer (A) to the above-mentioned curing type reaction is referred to herein as "cured material".

The methylene group-containing fluoropolymer (A) has repeating units having a methylene group (hereinafter referred to as "methylene group-containing repeating units") in the main chain thereof.

The methylene group is a chemical structure represented by —$CH_2$—.

Each methylene group-containing repeating unit is a repeating unit containing a chemical structure represented by —$CH_2$— among the repeating units in the molecular structure of the methylene group-containing fluoropolymer (A).

The methylene group-containing repeating unit is not particularly restricted but may be any chemical structure containing the chemical structure represented by —$CH_2$—. Thus, there may be mentioned, for example, —$CH_2$—$CF_2$—, —$CH_2$—$CH(CH_3)$—, and —$CH_2$—$CH_2$—, and these can be introduced into the polymer, for example, by polymerizing vinylidene fluoride [VdF], propylene [Pr], and ethylene [Et].

Since the methylene group-containing fluoropolymer (A) has the above-mentioned methylene group-containing repeating units in the main chain thereof, the fluoropolymer composition of the invention can be easily mixed with an additive or additives and the adhesion or bond strength between the cured material of the invention and another material can be improved. The methylene group-containing fluoropolymer (A) may contain, in the main chain thereof, further repeating units other than the methylene group-containing repeating units.

The methylene group-containing fluoropolymer (A) is not particularly restricted but includes, among others, a vinylidene fluoride [VdF]-based copolymer (I), a tetrafluoroethylene [TFE]-propylene [Pr]-based copolymer (II), and a hexafluoropropylene [HFP]-ethylene [Et]-based copolymer (III). These may be used singly, or two or more species may be used in combination unless the physical properties of the cured material of the invention are deteriorated.

The VdF-based copolymer (I) is preferred as the methylene group-containing fluoropolymer (A) in view of the excellent heat resistance and oil resistance of the cured material obtained therefrom.

The copolymer (I) may be a VdF homopolymer or a copolymer obtained by polymerization of VdF and an other comonomer.

The other comonomer in the copolymer (I) is not particularly restricted but may be any one copolymerizable with VdF. Thus, there may be mentioned, for example, a fluorine-containing monomer such as TFE, HFP, perfluoro(alkyl vinyl ether) [PAVE] species, chlorotrifluoroethylene [CTFE], trifluoroethylene, trifluoropropylene, tetrafluoropropylene, pentafluoropropylene, trifluorobutene, tetrafluoroisobutene and vinyl fluoride; and a fluorine-free monomer such as Et, propylene and an alkyl vinyl ether. One or a combination of two or more of these fluorine-containing monomers and fluorine-free monomers can be used.

Preferably, the other monomer in the copolymer (I) comprises TFE, HFP and/or a PAVE. The PAVE is represented by the general formula

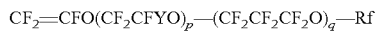

$$CF_2=CFO(CF_2CFYO)_p-(CF_2CF_2CF_2O)_q-Rf$$

wherein Y represents F or $CF_3$, Rf represents a perfluoroalkyl group-containing 1 to 5 carbon atoms, p represents an integer of 0 to 5 and q represents an integer of 0 to 5.

Preferred as the copolymer (I) is VdF/HFP copolymer, VdF/HFP/TFE copolymer, VdF/CTFE copolymer, VdF/CTFE/TFE copolymer, VdF/PAVE copolymer, VdF/TFE/PAVE copolymer, VdF/TFE/Pr copolymer, or VdF/Et/HFP copolymer.

The copolymer (I) preferably has a vinylidene fluoride repeating unit content of not lower than 40 mole percent but not higher than 85 mole percent relative to the total number of moles of the vinylidene fluoride repeating units and the repeating units derived from the comonomer(s) in the copolymer (I). A more preferred lower limit is 45 mole percent, a still more preferred lower limit is 50 mole percent, and a more preferred upper limit is 80 mole percent.

The VdF repeating unit is a part of the molecular structure of the copolymer (I) and is a moiety derived from VdF and represented by $-CH_2-CF_2-$.

The TFE-Pr-based copolymer (II) is preferred as the methylene group-containing fluoropolymer (A) since the cured material obtained therefrom is excellent in heat resistance and base resistance.

The copolymer (II) preferably has a tetrafluoroethylene repeating unit content of not lower than 45 mole percent but not higher than 70 mole percent relative to the total number of moles of the tetrafluoroethylene repeating units and propylene repeating units. A more preferred lower limit is 50 mole percent, and a more preferred upper limit is 65 mole percent.

The tetrafluoroethylene repeating unit is a part of the molecular structure of the copolymer (II) and is a TFE-derived moiety.

The propylene repeating unit is a part of the molecular structure of the copolymer (II) and is a Pr-derived moiety and represented by $-CH_2-CH(CH_3)-$.

The copolymer (II) may be a copolymer derived from TFE and Pr alone or a copolymer obtained by polymerizing TFE and Pr, together with an other comonomer in the copolymer (II). As the other comonomer, there may be mentioned, among others, the above-mentioned fluorine-containing monomers other than TFE and the above-mentioned fluorine-free monomers other than Pr. TFE/Pr/VdF copolymer is preferred as the copolymer (II).

When the copolymer (II) is a copolymer obtained by polymerizing TFE and Pr, together with such an other comonomer as mentioned above, the other comonomer-derived "other comonomer repeating unit" content is preferably not lower than 0 mole percent but not higher than 40 mole percent relative to the total number of moles of the TFE repeating units, Pr repeating units and "other comonomer repeating units". A more preferred lower limit is 5 mole percent, a still more preferred lower limit is 10 mole percent, and a more preferred upper limit is 30 mole percent.

Preferably, the methylene group-containing fluoropolymer (A) is the HFP-Et-based copolymer (III) since the cured material obtained therefrom is excellent in heat resistance and base resistance.

The copolymer (III) preferably has a hexafluoropropylene repeating unit content of not lower than 15 mole percent but not higher than 50 mole percent relative to the total number of moles of hexafluoropropylene repeating units and ethylene repeating units. A more preferred lower limit is 20 mole percent, and a more preferred upper limit is 45 mole percent.

The hexafluoropropylene repeating unit is a part of the molecular structure of the copolymer (III) and is a HFP-derived moiety and represented by $-CF_2-CF(CF_3)-$.

The ethylene repeating unit is a part of the molecular structure of the copolymer (III) and is a Et-derived moiety and represented by $-CH_2-CH_2-$.

The copolymer (III) may be a copolymer derived from HFP and Et alone or a copolymer obtained by polymerizing HFP and Et, together with an other comonomer. As the other comonomer in the copolymer (III), there may be mentioned, among others, the above-mentioned fluorine-containing monomers other than HFP and the above-mentioned fluorine-free monomers other than Et. Et/HFP/VdF copolymer or Et/HFP/TFE copolymer is preferred as the copolymer (III).

When the copolymer (III) is a copolymer obtained by polymerizing Et and an other comonomer, the other comonomer-derived "other comonomer repeating unit" content is preferably not lower than 0 mole percent but lower than 40 mole percent relative to the total number of moles of Et repeating units and "other comonomer repeating units". A more preferred lower limit is 10 mole percent, a still more preferred lower limit is 15 mole percent, and a more preferred upper limit is 30 mole percent.

The methylene group-containing fluoropolymer (A) may be any one substantially having a carbon-carbon double bond or Si—H group at 'one terminus of the chain' and at 'the other terminus of the chain'. The clause "the methylene group-containing fluoropolymer (A) substantially has a carbon-carbon double bond or Si—H group at 'one terminus of the chain' and at 'the other terminus of the chain'" as used herein means that while the majority of the molecules of the methylene group-containing fluoropolymer (A) have a carbon-carbon double bond or Si—H group at 'one terminus of the chain' and at 'the other terminus of the chain', a part of the molecules may have no carbon-carbon double bond or Si—H group at 'the other terminus of the chain' and a very small proportion of the molecules may have no carbon-carbon double bond or Si—H group either at 'one terminus of the chain' or at 'the other terminus of the chain', unless the curing type reaction is adversely affected. The polymer (A) having a carbon-carbon double bond or Si—H group at "one terminus of the chain" and at "the other terminus of the chain", so referred to herein, conceptually includes the above-mentioned one "substantially having a carbon-carbon double bond or Si—H group at 'one terminus of the chain' and at 'the other terminus of the chain'" as well.

In the above-mentioned methylene group-containing fluoropolymer (A), one terminus of the chain is a carbon-carbon double bond or Si—H group, and the other terminus of the chain is an Si—H group or carbon-carbon double bond.

The "chain" in the above-mentioned "one terminus of the chain" and "the other terminus of the chain", so referred to herein, conceptually includes both the main chain and any side chain. Thus, the cases that can be supposed include (1) "one terminus of the chain" and "the other terminus of the chain" are both main chain termini, (2) "one terminus of the chain" is a main chain terminus and "the other terminus of the chain" is a side chain terminus, and (3) "one terminus of the chain" and "the other terminus of the chain" are both side chain termini. In particular when the main chain terminus has no curing site but the curing site occurs in the middle of the main chain, that each chain portion from the curing site to the main chain terminus is not directly involved in crosslinking but rather acts as a plasticizer, so that the mechanical strength of the cured material tends to decrease. Therefore, for the fluoropolymer composition of the invention, the cases (1) and (2) are preferred, and the case (1) is more preferred.

The methylene group-containing fluoropolymer (A) may further have at least one curing site in the middle of the main chain.

The phrase "further having at least one curing site in the middle of the main chain" conceptually includes both the case where the site is directly bound to a carbon atom other than the both terminal carbon atoms of the main chain among the main chain-constituting carbon atoms and the case where it occurs in a side chain. In cases where the polymer has at least one curing site in the middle of the main chain, the case where the site is on a side chain is preferred since it is readily involved in the curing type reaction.

In cases where both the above-mentioned "one terminus of the chain" and "the other terminus of the chain" are main chain termini, the methylene group-containing fluoropolymer (A) may belong to the following three classes according to the chemical structures at the main chain termini: polymer (1) having a carbon-carbon double bond at each terminus of the main chain, polymer (2) having a carbon-carbon double bond at one terminus of the main chain and an Si—H group at the other terminus of the main chain, and polymer (3) having an Si—H group at each terminus of the main chain. The polymer (1) and polymer (3) are preferred, however, since they can be synthesized relatively easily, the method of crosslinking can be selected with ease and they can give uniform cured materials.

When the fluoropolymer composition of the invention comprises the polymer (1) and/or polymer (3) as the methylene-containing fluoropolymer (A), the fluoropolymer composition of the invention, whether it contains the polymer (2) or not, can be subjected to hydrosilylation reaction by adding a hydrosilylation catalyst (B) even when it does not contain any hydrosilylation reaction-capable compound (C), which is to be described later herein.

When the fluoropolymer composition of the invention comprises the polymer (2) as the methylene group-containing fluoropolymer (A), the composition, whether it contains the polymer (1) and/or polymer (3) or not, can be subjected to curing type reaction by adding a hydrosilylation catalyst (B).

When the fluoropolymer composition contains no hydrosilylation reaction-capable compound (C), it is preferred that the methylene group-containing fluoropolymer (A) has at least one carbon-carbon double bond or Si—H group in the middle of the main chain thereof. When the methylene group-containing fluoropolymer (A) in the fluoropolymer composition has no carbon-carbon double bond or Si—H group in the middle of the main chain thereof, the hydrosilylation reaction-capable compound (C) mentioned later herein is preferably one having at least three functional groups in each molecule.

The polymer (1), polymer (2) and polymer (3) each may comprise one single species or two or more species whose main chains differ in methylene group-containing repeating units.

The methylene group-containing fluoropolymer (A) is preferably a fluorine-containing elastomer.

Further, the methylene group-containing fluoropolymer (A) preferably has fluidity at ordinary temperature.

The term "ordinary temperature" as used herein means 0 to 50° C. When the methylene group-containing fluoropolymer (A) thus has fluidity at ordinary temperature, molded articles complicated in shape and form can be readily obtained and, further, on-site type molding becomes possible.

The methylene group-containing fluoropolymer (A) having fluidity at ordinary temperature is now described more specifically from the viscosity and number average molecular weight viewpoint.

The methylene group-containing fluoropolymer (A) preferably shows a viscosity of not lower than 0.1 Pa·s but not higher than 2,000 Pa·s at the above-defined ordinary temperature. When the viscosity is lower than 0.1 Pa·s, the polymer chain is too short, hence crosslinking is difficult in some instances. When it exceeds 2,000 Pa·s, the polymer no longer shows fluidity at ordinary temperature in certain instances. A more preferred lower limit is 1 Pa·s, and a more preferred upper limit is 1,000 Pa·s. The viscosity referred to hereinabove is the value obtained by using a type E viscometer. A polymer having a viscosity of lower than 0.1 Pa·s can be modified using a chain extender to give a polymer having a viscosity within the range specified above and capable of producing the same effects as those of the present invention.

The methylene group-containing fluoropolymer (A) preferably has a Mooney viscosity at ordinary temperature of not lower than 5 but not higher than 100. When the viscosity is lower 5, the polymer chain is too short and, therefore, crosslinking is difficult in some instances. When it exceeds 100, the polymer no longer shows fluidity at ordinary temperature in certain instances. A more preferred upper limit is 75, and a still more preferred upper limit is 50.

The Mooney viscosity so referred to herein is the value obtained by measurement using a Mooney viscometer (trademark: MV2000, product of Monsanto Co.) according to JIS K 6300 (1994).

The methylene group-containing fluoropolymer (A) preferably has a number average molecular weight of not lower than 500 but not higher than 20,000. When the number average molecular weight is lower than 500, the formation of a three-dimensional network structure by crosslinking may become difficult in some instances and, when is exceeds 20,000, the polymer no longer shows fluidity at ordinary temperature in certain cases. A more preferred lower limit is 900, whereas a preferred upper limit is 15,000, a more preferred upper limit is 10,000 and a still more preferred upper limit is 5,000. The methylene group-containing fluoropolymer (A) having a number average molecular weight within the above range can be readily subjected to molding processing or curing reaction at ordinary temperature.

The number average molecular weight so referred to herein is the value determined by terminal group concentration quantitation. The terminal group concentration can be determined by nuclear magnetic resonance spectrometry [NMR] or infrared spectroscopic analysis [IR].

Among the polymers belonging to the above-mentioned polymer (3) class, a methylene group-containing fluoropolymer selected from the group consisting of vinylidene fluoride-based copolymer (I), tetrafluoroethylene [TFE]-propylene [Pr]-based copolymer (II) and hexafluoropropylene [HFP]-ethylene [Et]-based copolymer (III) and having an Si—H group at each of both termini of the main chain and a number average molecular weight of not lower than 500 but not higher than 500,000 (hereinafter referred to as "methylene group-containing fluoropolymer (A1)") also constitutes an aspect of the present invention.

As preferred specific examples of the above-mentioned vinylidene fluoride-based copolymer (I), TFE-Pr-based copolymer (II) and HFP-Et-based copolymer (III), there may be mentioned the same ones as mentioned hereinabove.

As regards the number average molecular weight of the methylene group-containing fluoropolymer (A1), a preferred lower limit is 900, a more preferred lower limit is 1,000 and a still more preferred lower limit is 2,000, and a preferred upper limit is 200,000, a more preferred upper limit is 100,000, a still more-preferred upper limit is 20,000, a particularly preferred upper limit is 15,000 and a most preferred upper limit is 5,000.

The "methylene group-containing fluoropolymer (A)" so referred to hereinafter conceptually includes the above-mentioned methylene group-containing fluoropolymer (A1), unless otherwise specified.

The method of producing the methylene group-containing fluoropolymer (A) by polymerization is not particularly restricted but may be any of the methods by which a carbon-carbon double bond and/or Si—H group can be introduced into the chain termini in the step of polymerization or by a terminal modification reaction after polymerization. The polymerization can be carried out by any of the polymerization methods known in the art, for example by emulsion polymerization, suspension polymerization or solution polymerization.

The polymerization for obtaining the methylene group-containing fluoropolymer (A) is preferably carried out at 5 to 120° C. At temperatures lower than 5° C., the reaction will be too slow, hence unfavorable from the industrial viewpoint in some instances, and temperatures above 120° C. are of no great merit.

The method of introducing a carbon-carbon double bond into a main chain terminus of the methylene group-containing fluoropolymer (A) is not particularly restricted. For example, it is also possible to introduce such bond by conversion of an alkoxycarbonyl group. Usable as the method for this conversion is, for example, the method comprising reacting an alkoxycarbonyl group with a carbon-carbon double bond-containing amine for amidation. The carbon-carbon double bond-containing amine is not particularly restricted but may be, for example, an amine having an unsaturated group such as an allyl group and, for example, unsaturated group-containing amines described in Japanese Kokai Publication 2001-8.1131 and the compound (5) described in Japanese Kokai Publication H08-198926 can be used. The carbon-carbon double bond can also be obtained, for example, by the method comprising reacting a polymer having hydroxyl group at each of both chain termini with an allyl isocyanate. The polymer having hydroxyl group at each of both chain termini can also be synthesized by the method disclosed in Japanese Patent Publication (Kokoku) S63-44744.

That a carbon-carbon double bond has been introduced into a main chain terminus of the methylene group-containing fluoropolymer (A) can be confirmed by nuclear magnetic resonance spectroscopy [NMR] or infrared spectroscopic analysis [IR], for instance.

The method of introducing an Si—H group at a main chain terminus of the methylene group-containing fluoropolymer (A) is not particularly restricted but the introduction can be attained, for example, by the method comprising reacting a carbon-carbon double bond at a main chain terminus with a compound having two Si—H groups.

As the method of introducing a carbon-carbon double bond or Si—H group into a site in the middle of the main chain of the methylene group-containing fluoropolymer (A), there may be mentioned, for example, the above-mentioned method comprising conversion of a curing site different in kind.

That an Si—H group has been introduced into a main chain terminus of the methylene group-containing fluoropolymer (A) can be confirmed by NMR or IR, for instance.

The methylene group-containing fluoropolymer (A) is capable of hydrosilylation in the presence of a hydrosilylation catalyst (B).

The hydrosilylation catalyst (B) is used for promoting the hydrosilylation reaction.

As a result of the hydrosilylation reaction, the curing type reaction proceeds between the chain terminal Si—H group-containing, methylene group-containing fluoropolymer (A) and the chain terminal carbon-carbon double bond-containing, methylene group-containing fluoropolymer (A), whereby a cured material can be obtained. When the fluoropolymer composition of the invention contains a hydrosilylation reaction-capable compound (C) which is to be mentioned later herein, crosslinking proceeds between the methylene group-containing fluoropolymer (A) and the hydrosilylation reaction-capable compound (C), whereby a cured material can be obtained.

The hydrosilylation catalyst (B) is not particularly restricted but may be any of those capable of promoting the hydrosilylation reaction, including, among others, a platinum-based catalyst, a palladium-based catalyst, a rhodium-based catalyst, a ruthenium-based catalyst, a iridium-based catalyst and like platinum group elementbased addition reaction catalysts (a metal of the group 8 of the short period table of elements, a complexe of such group 8 metals, a compound of such group 8 metals, and like catalysts based on such group 8 metals). Among them, a platinum-based catalyst is preferred in view of their ready availability.

Generally, the platinum-based catalysts may be those known in the art and used in addition type curing, including among others, finely divided metallic platinum catalysts described in U.S. Pat. No. 2,970,150, chloroplatinic acid catalysts described in U.S. Pat. No. 2,823,218, platinum-hydrocarbon complexes described in U.S. Pat. Nos. 3,159,601 and 3,159,662, chloroplatinic acid-olefin complexes described in U.S. Pat. No. 3,516,946, and platinum-vinylsiloxane complexes described in U.S. Pat. Nos. 3,775,452 and 3,814,780.

More specifically, there may be mentioned simple substance platinum (platinum black); chloroplatinic acid; chloroplatinic acid-olefin (e.g. ethylene) complexes; chloroplatinic acid-alcohol or vinylsiloxane complexes; platinum supported on silica, alumina, carbon or a like support.

As the palladium-based catalyst, there may be mentioned palladium, a palladium compound, a chloropalladinic acid and so forth, for example Pd(PPh$_3$)$_4$ (Ph representing a phenyl group).

As the rhodium-based catalyst, there may be mentioned rhodium, a rhodium compound, rhodium chloride and so forth, for example RhCl(PPh$_3$)$_3$, RhCl(CO)(PPh$_3$)$_2$, RhCl(C$_2$H$_4$)$_2$ (Ph representing a phenyl group), etc.

As the ruthenium-based catalyst, there may be mentioned, for example, Ru$_3$(CO)$_{12}$ and so forth. As the iridium-based catalyst, there may be mentioned, for example, IrCl(CO)(PPh$_3$)$_2$ (Ph representing a phenyl group) and the like.

The hydrosilylation catalyst (B) may be a Lewis acid or cobalt carbonyl, for instance.

The hydrosilylation catalyst (B) can be used in a well-known catalytic amount of the hydrosilylation catalyst (B) employed. In the case of a platinum group element-based addition reaction catalyst, the catalyst is preferably added in an amount such that the mass of the platinum group element contained in the addition reaction catalyst amounts to not lower than 0.1 ppm but not higher than 1%, more preferably not lower than 0.1 ppm but not higher than 1,000 ppm, relative to the total mass of the methylene group-containing fluoropolymer (A) and the hydrosilylation reaction-capable compound (C) described later herein, which is to be added when desired.

The fluoropolymer composition of the invention preferably comprises the above-mentioned methylene group-containing fluoropolymer (A), the above-mentioned hydrosilylation catalyst (B) and a hydrosilylation reaction-capable compound (C).

The hydrosilylation reaction-capable compound (C) is a compound capable of hydrosilylation with the methylene group-containing fluoropolymer (A).

In cases where the methylene group-containing fluoropolymer (A) has a carbon-carbon double bond at each main chain terminus thereof, the hydrosilylation reaction-capable compound (C) is preferably an Si—H group-containing compound (C1) having at least two Si—H groups within the molecule.

A compound represented by the general formula $R^1{}_bH_cSiO_{(4-b-c)/2}$ can generally be used as the above-mentioned Si—H group-containing compound (C1). In the above general formula, $R^1$ represents a substituted or unsubstituted monovalent hydrocarbon group-containing 1 to 10 carbon atoms, in particular 1 to 8 carbon atoms (having no aliphatic unsaturated bond) and, as such monovalent hydrocarbon group, there may be mentioned, among others, a halogen-substituted alkyl group such as trifluoropropyl group, a alkyl group and a phenyl group. Among them, methyl, ethyl, propyl, phenyl and trifluoropropyl are preferred and, in particular, methyl and phenyl are preferred.

In the above general formula, b is $0 \leq b < 3$, preferably $0.6 < b < 2.2$, more preferably $1.5 \leq b \leq 2$, and c is $0 < c \leq 3$, preferably $0.002 \leq c < 2$, more preferably $0.01 \leq c \leq 1$, and b+c is $0 < b+c \leq 3$, preferably $1.5 < b+c \leq 2.7$.

The above-mentioned Si—H group-containing compound (C1) is preferably an organohydrogenpolysiloxane containing 2 to 1,000, more preferably 2 to 300, most preferably 4 to 200, silicon atoms in each molecule. More specifically, it includes, among others, a siloxane oligomer such as 1,1,3,3-tetramethyldisiloxane, 1,3,5,7-tetramethyltetrasiloxane and 1,3,5,7,8-pentamethylpentacyclosiloxane; methylhydrogenpolysiloxane blocked at each of both molecular chain termini with a trimethylsiloxy group, dimethylsiloxane/methylhydrogensiloxane copolymer blocked at each of both molecular chain termini with trimethylsiloxy group, methylhydrogenpolysiloxane blocked at each of both molecular chain termini with a silanol group, dimethylsiloxane/methylhydrogensiloxane copolymer blocked at each of both molecular chain termini with a silanol group, dimethylpolysiloxane blocked at each of both molecular chain termini with dimethylhydrogensiloxy group, methylhydrogenpolysiloxane blocked at each of both molecular chain termini with a dimethylhydrogensiloxy group, dimethylsiloxane/methylhydrogensiloxane copolymer blocked at each of both molecular chain termini with a dimethylhydrogensiloxy group, and a silicone resin which comprises $R^1{}_2(H)SiO_{1/2}$ unit and $SiO_{4/2}$ unit and may optionally comprises $R^1{}_3SiO_{1/2}$ unit, $R^4{}_2SiO_{2/2}$ unit (in which the two $R^4$ groups are the same or different and each represents a substituted or unsubstituted monovalent hydrocarbon group-containing 1 to 10, preferably 1 to 8 carbon atoms), $R^1(H)SiO_{2/2}$ unit, $(H)SiO_{3/2}$ unit or $R^1SiO_{3/2}$ unit.

As the methylhydrogenpolysiloxane blocked at each of both molecular chain termini with trimethylsiloxy group, there may be mentioned, among others, compounds represented by the general formula given below, and compounds derived therefrom by substitution of part or all of the methyl groups by ethyl, propyl, phenyl, trifluoropropyl or like groups.

$(CH_3)_3SiO$—$(SiH(CH_3)$—$O)_d$—$Si(CH_3)_3$ wherein d represents an integer of not smaller than 2.

As the dimethylsiloxane/methylhydrogensiloxane copolymers blocked at each of both molecular chain termini with a trimethylsiloxy group, there may be mentioned, among others, compounds represented by the general formula given below, and compounds derived therefrom by substitution of part or all of the methyl groups by ethyl, propyl, phenyl, trifluoropropyl or like groups.

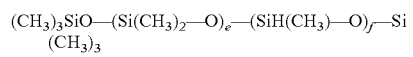

$(CH_3)_3SiO$—$(Si(CH_3)_2$—$O)_e$—$(SiH(CH_3)$—$O)_f$—$Si(CH_3)_3$ wherein e represents an integer of not smaller than 1 and f represents an integer of not smaller than 2.

As the methylhydrogenpolysiloxane blocked at each of both molecular chain termini with a silanol group, there may be mentioned, among others, compounds represented by the general formula given below, and compounds derived therefrom by substitution of part or all of the methyl groups by ethyl, propyl, phenyl, trifluoropropyl or like groups.

$HOSi(CH_3)_2O$—$(SiH(CH_3)$—$O)_2$—$Si(CH_3)_2OH$

As the dimethylsiloxane/methylhydrogensiloxane copolymer blocked at each of both molecular chain termini with a silanol group, there may be mentioned, among others, compounds represented by the general formula given below, and compounds derived therefrom by substitution of part or all of the methyl groups by ethyl, propyl, phenyl, trifluoropropyl or like groups.

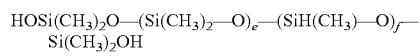

$HOSi(CH_3)_2O$—$(Si(CH_3)_2$—$O)_e$—$(SiH(CH_3)$—$O)_f$—$Si(CH_3)_2OH$ wherein e represents an integer of not smaller than 1 and f represents an integer of not smaller than 2.

As the dimethylpolysiloxane blocked at each of both molecular chain termini with a dimethylhydrogensiloxy group, there may be mentioned, among others, compounds represented by the general formula given below, and compounds derived therefrom by substitution of part or all of the methyl groups by ethyl, propyl, phenyl, trifluoropropyl or like groups.

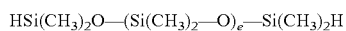
HSi(CH$_3$)$_2$O—(Si(CH$_3$)$_2$—O)$_e$—Si(CH$_3$)$_2$H wherein e represents an integer of not smaller than 1.

As the methylhydrogenpolysiloxane blocked at each of both molecular chain termini with a dimethylhydrogensiloxy group, there may be mentioned, among others, compounds represented by the general formula given below, and compounds derived therefrom by substitution of part or all of the methyl groups by ethyl, propyl, phenyl, trifluoropropyl or like groups.

HSi(CH$_3$)$_2$O—(SiH(CH$_3$)—O)$_e$—Si(CH$_3$)$_2$H wherein e represents an integer of not smaller than 1.

As the dimethylsiloxane/methylhydrogensiloxane copolymer blocked at each of both molecular chain termini with a dimethylhydrogensiloxy group, there may be mentioned, among others, compounds represented by the general formula given below, and compounds derived therefrom by substitution of part or all of the methyl groups by ethyl, propyl, phenyl, trifluoropropyl or like groups.

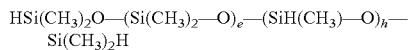
HSi(CH$_3$)$_2$O—(Si(CH$_3$)$_2$—O)$_e$—(SiH(CH$_3$)—O)$_h$—Si(CH$_3$)$_2$H wherein e and h each represents an integer of not smaller than 1.

Such compounds can be produced in the conventional manner. For example, they can be obtained with ease by equilibrating octamethylcyclotetrasiloxane and/or tetramethylcyclotetrasiloxane with a compound containing a triorganosilyl group or diorganohydrogensiloxy group capable of serving as a terminal group in the presence of a catalyst such as sulfuric acid, trifluoromethanesulfonic acid or methanesulfonic acid at a temperature of about −10 to 40° C. As the triorganosilyl group-containing compound, there may be mentioned hexamethyldisiloxane, for instance.

As the diorganohydrogensiloxy group-containing compound, there may be mentioned 1,3-dihydro-1,1,3,3-tetramethyldisiloxane, for instance.

As the above-mentioned Si—H group-containing compound (C1), there may be mentioned compounds having at least one monovalent perfluorooxyalkyl group, monovalent perfluoroalkyl group, divalent perfluorooxyalkylene group and/or divalent perfluoroalkylene group and at least two, preferably three or more, Si—H groups. As the perfluorooxyalkyl group, perfluoroalkyl group, perfluorooxyalkylene group and perfluoroalkylene group, there may be mentioned, among others, those represented by the following general formulas:

<Monovalent perfluoroalkyl group> C$_k$F$_{2k+1}$— (in which k represents an integer of 1 to 20, preferably 2 to 10);

<Divalent perfluoroalkylene group> —C$_k$F$_{2k}$— (in which k represents an integer of 1 to 20, preferably 2 to 10);

<Monovalent Perfluorooxyalkyl Group>

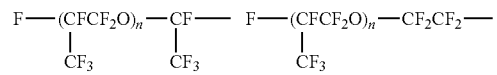

(in which n represents an integer of 1 to 5);

<Divalent Perfluorooxyalkylene Group>

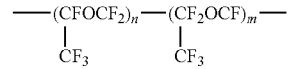

(in which m represents an integer of 1 to 50 and n represents an integer of 1 to 50, m+n satisfying 2 to 100);

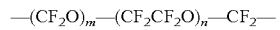
—(CF$_2$O)$_m$—(CF$_2$CF$_2$O)$_n$—CF$_2$—

(in which m and n each represents an integer of 1 to 50).

The divalent group linking the above-mentioned perfluoroalkyl group, perfluorooxyalkyl group, perfluoroalkylene group or perfluorooxyalkylene group to a silicon atom may be an alkylene group, an arylene group, a combination of an alkylene group and an arylene group, or a group derived from any of such groups by addition or insertion of an ether bond oxygen atom, an amide bond, a carbonyl bond or the like. Thus, for example, there may be mentioned —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)—CO— (in which Ph represents a phenyl group), —CH$_2$CH$_2$CH$_2$—N(CH$_3$)—CO—, —CH$_2$CH$_2$CH$_2$—O—CO—, and like groups containing 2 to 12 carbon atoms.

As the monovalent substituent which is other than the monovalent organic group-containing the monovalent or divalent fluorine-containing substituent, namely the perfluoroalkyl group, perfluorooxyalkyl group, perfluoroalkylene group or perfluorooxyalkylene group, and is bound to a silicon atom in the Si—H group-containing compound (C1), there may be mentioned, among others, unsubstituted or substituted hydrocarbon groups containing 1 to 20 carbon atoms, for example alkyl groups such as methyl, ethyl, propyl, butyl, hexyl, cyclohexyl, octyl and decyl; alkenyl groups such as vinyl and allyl; aryl groups such as phenyl, tolyl and naphthyl; aralkyl groups such as benzyl and phenylethyl; and groups derived from such groups as mentioned above by substitution of at least part of the hydrogen atoms thereof by one or more chlorine atoms, cyano groups or other atoms or groups, for example chloromethyl, chloropropyl and cyanoethyl.

The Si—H group-containing compound (C1) may have a cyclic structure, a linear structure or a three-dimensional network structure, or a combination thereof. The number of silicon atoms in the Si—H group-containing compound (C1) is not particularly restricted but generally is 2 to 60, preferably about 3 to 30.

As the Si—H group-containing compound (C1), there may be mentioned, for example, the compounds given below. In the formulas, Me represents a methyl group, and Ph represents a phenyl group. These compounds may be used singly or two or more of them may be used in combination.

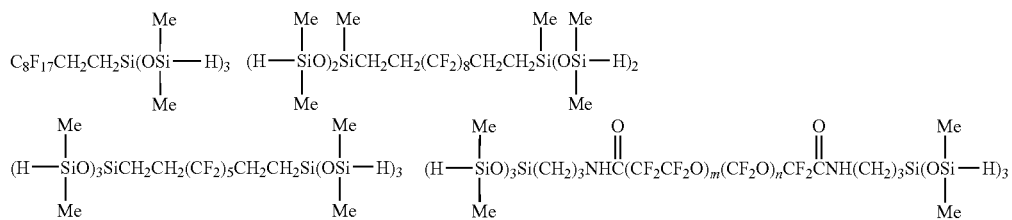
(In the above formula, m represents an integer of 1 to 20, on average 10, and n represents an integer of 1 to 10, on average 6.)
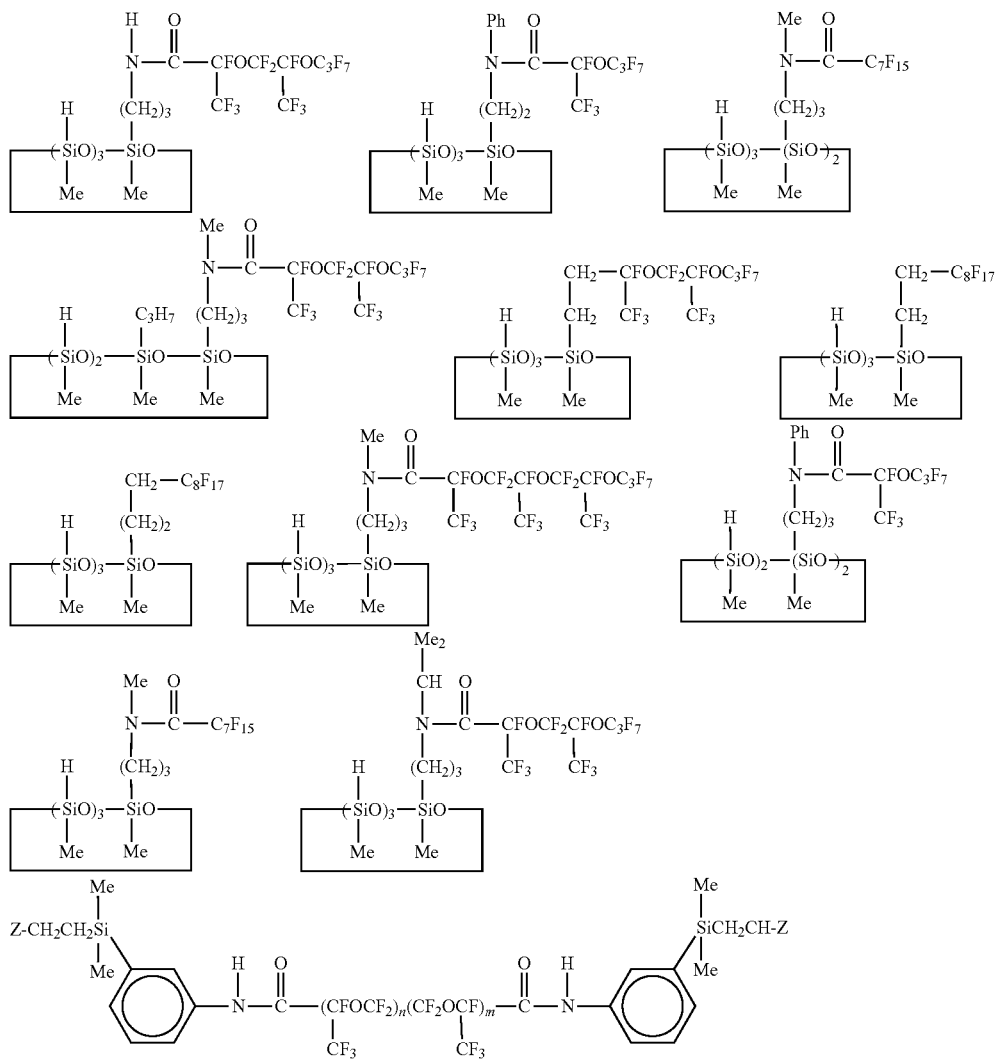
(In the above formula, Z represents
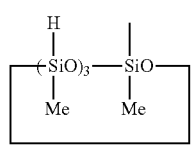
n represents an integer of 1 to 30 and m represents an integer of 1 to 30, n+m being 2 to 60, on average 2 to 50.)
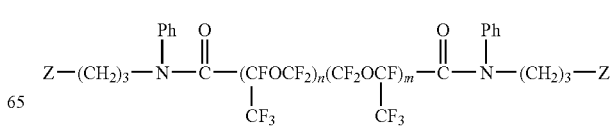

(In the above formula, Z represents

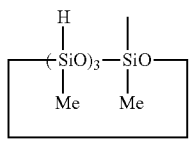

n represents an integer of 1 to 30 and m represents an integer of 1 to 30, n+m satisfying 2 to 60, on average 2 to 50.)

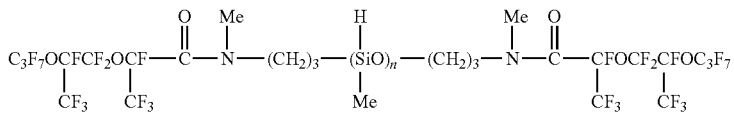

(In the above formula, n represents an integer of 2 to 60, on average 3 to 50.)

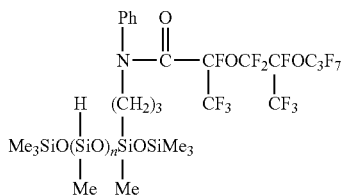

(In the above formula, n represents an integer of 2 to 60, on average 3 to 50.)

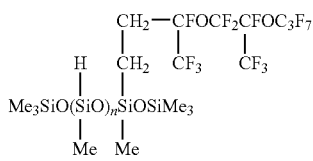

(In the above formula, n represents an integer of 2 to 60, on average 3 to 50.)

When both the main chain termini of the above-mentioned methylene group-containing fluoropolymer (A) each is an Si—H group, the hydrosilylation reaction-capable compound (C) is preferably a double bond-containing compound (C2) having at least two carbon-carbon double bonds in the molecule.

The double bond-containing compound (C2) is not particularly restricted but includes, among others, triallyl isocyanurate, triallyl cyanurate, trimethallyl isocyanurate, triacrylformal and triallyl trimellitate.

The hydrosilylation reaction-capable compound (C) may comprise a hydrosilylation reaction-capable polymer (Cp).

The hydrosilylation reaction-capable polymer (Cp) is a polymer among the compounds capable of hydrosilylation with the methylene group-containing fluoropolymer (A). The hydrosilylation reaction-capable polymer (Cp) may be any one generally recognized as such a polymer but preferably has a number average molecular weight of 500 to 2,000,000.

The hydrosilylation reaction-capable polymer (Cp) has a carbon-carbon double bond and/or an Si—H group at a main chain terminus and/or in the middle of the main chain. When the hydrosilylation reaction-capable polymer (Cp) has at least two Si—H groups within the molecule, it is conceptually included under the Si—H group-containing compound (C1) and, when it has at least two carbon-carbon double bonds within the molecule, it is conceptually included under the double bond-containing compound (C2).

One or two or more hydrosilylating compounds (C), each of which may be a carbon-carbon double bond-containing one or an Si—H group-containing one, can be appropriately selected and use so that carbon-carbon double bonds and Si—H groups may properly coexist in the fluoropolymer composition. As the hydrosilylation reaction-capable compound (C) in the fluoropolymer composition of the invention, use may be made of the above-mentioned hydrosilylation reaction-capable polymer (Cp) in combination with the above-mentioned Si—H group-containing compound (C1) differing from the hydrosilylation reaction-capable polymer (Cp), or the hydrosilylation reaction-capable polymer (Cp) in combination with the above-mentioned double bond-containing compound (C2) differing from the hydrosilylation reaction-capable polymer (Cp).

The hydrosilylation reaction-capable polymer (Cp) is not particularly restricted but includes, among others, unsaturated group-containing α-olefin/conjugated diene copolymer rubbers; unsaturated group-containing Et/Pr rubbers; silicone oligomers, silicone rubbers, and fluorosilicone rubbers. Preferred as fluorosilicone rubbers are Si—H group-containing ones.

The hydrosilylation reaction-capable polymer (Cp) preferably comprises a silicone rubber and/or a fluorosilicone rubber.

The silicone rubber and/or fluorosilicone rubber preferably occurs as a liquid at ordinary temperature. The "ordinary temperature" means 0° C. to 50° C., as described above.

Preferably used as the hydrosilylation reaction-capable polymer (Cp) are silicone oligomers, silicone rubbers, fluorosilicone rubbers and the like. However, it is not always necessary to use the hydrosilylation reaction-capable polymer (Cp) if carbon-carbon double bonds and Si—H groups coexist in the fluoropolymer composition of the invention, as already mentioned hereinabove.

The methylene group-containing fluoropolymer (A) and the hydrosilylation reaction-capable compound (C), which is optionally used when desired, in the fluoropolymer composition of the invention are preferably used at addition levels such that the number of Si—H groups may amount to 0.5 to 10 relative to one carbon-carbon double bond contained in the fluoropolymer composition. A more preferred lower limit to the number of Si—H groups per carbon-carbon double bond contained in the fluoropolymer composition is 1, and a more preferred upper limit is 7. At addition levels such that the number of Si—H groups per carbon-carbon double bond is too low, the degree of crosslinking may become insufficient in certain cases and, at excessive addition levels, excess Si—H groups remain and cause deterioration with time.

The fluoropolymer composition of the invention may contain one or more additives.

The levels of addition of the additives are not particularly restricted but the additives can be used at levels generally known in the art within limits within which the effects of the invention will not be reduced. Preferably, they are used at a total addition level of 0.5 to 50% by mass relative to the fluoropolymer composition of the invention.

The additives are not particularly restricted but include, among others, fillers, processing aids, oxidation inhibitors, antioxidants, antistatic agents, antiozonants, ultraviolet absorbers, hydrosilylation inhibitors, etc.

The fluoropolymer composition of the invention may contain an oil or the like added for the purpose of adjusting the viscosity of the fluoropolymer composition or lowering the glass transition point of the cured material obtained using the fluoropolymer composition.

Preferred as the oil is an oil having a curing site or sites capable of being involved in the reaction for curing the fluoropolymer composition, since such oil can improve the mechanical characteristics of the cured material. Preferred as the oil is an oil having a viscosity lower than the viscosity of the methylene group-containing fluoropolymer (A), since such oil can lower the viscosity of the fluoropolymer composition. Preferred as the oil is an oil having a glass transition point lower than the glass transition point of the methylene group-containing fluoropolymer (A), since such oil can lower the glass transition point of the cured material obtained.

As the reaction inhibitors, there may be mentioned, among others, benzotriazole; acrylonitrile; amide compounds such as N,N-diallylacetamide, N,N-diallylbenzamide, N,N,N',N'-tetraallyl-o-phthalic diamide, N,N,N',N'-tetraallyl-m-phthalic diamide and N,N,N',N'-tetraallyl-pphthalic diamide; sulfur; amine compounds; sulfur compounds; phosphorus compounds; tin compounds; tetramethyltetravinylcyclotetrasiloxane; and organic peroxides such as hydroperoxides.

As the reaction inhibitors, there may also be mentioned acetylene compounds, for example acetylene alcohols such as 1-ethynyl-1-hydroxycyclohexane, 2-ethynylisopropanol, 3-methyl-1-butyn-3-ol, 3,5-dimethyl-1-hexyn-3-ol and phenylbutynol, 3-methyl-3-penten-1-yne, 3,5-dimethyl-3-hexen-1-yne, 3-methyl-1-penten-3-ol, and compounds described as examples of the formulation ingredient (4) in U.S. Pat. No. 3,445,420 and compounds given as examples of the formulation ingredient (d) in Japanese Patent Publication (Kokoku) S54-3774, among others.

The method of preparing and curing the fluoropolymer composition of the invention is not particularly restricted but may be any of the conventional methods for mixing known in the art. In cases where the methylene group-containing fluoropolymer (A) has a low molecular weight, the compounding may be carried out using a planetary mixer or a table mixer.

The fluoropolymer composition of the invention may be either a one-pack type one or a two-pack type one. In cases where the crosslinking can proceed at ordinary temperature, the two-pack type is preferred. In the case of the two-pack type, the first pack may comprise a mixture of the methylene group-containing fluoropolymer (A) and the hydrosilylation catalyst (B) and the second pack may comprise a mixture of the methylene group-containing fluoropolymer (A) and the hydrosilylation reaction-capable compound (C), for instance.

The fluoropolymer composition of the invention can be molded by the method using an extruding gun such as a hot melt gun or dispenser; the method using a LIMS (Liquid Injection Molding System) molding machine (LIM method); the method comprising mixing together the two liquids just before molding; the method comprising pouring into a mold at ordinary temperature to 200° C. for molding; or FIPG (Formed In Place Gasket) method, for instance.

The above-mentioned FIPG method is a method of molding the so-called freely molded gaskets or in-place molded gaskets using a coating robot, transportation pump and dispenser in combination. As FIPG method, there may be mentioned, for example, the method comprising feeding the fluoropolymer composition to the transportation pump, and discharging the composition from the dispenser and at the same time applying, by means of the coating robot, according to a pattern memorized in advance to thereby mold gaskets or the like. This method is judiciously used in in-place laying, in particular, since the method by which the application is carried out in a preliminarily memorized pattern using robot mechanisms makes it possible to lay gaskets or like packing materials made of the fluoropolymer composition exactly at predetermined places.

In particular, when the fluoropolymer (A) in the fluoropolymer composition has fluidity at ordinary temperature, the composition has good fluidity and can favorably be molded by the method illustrated above by way of example with ease.

The fluoropolymer composition of the invention utilizes the hydrosilylation reaction, which serves as the curing reaction and, since each of both chain termini of the methylene group-containing fluoropolymer (A) is a carbon-carbon double bond or Si—H group, the cured material obtained can be improved in mechanical strength and so forth. Further, the lower the molecular weight of the methylene group-containing fluoropolymer (A) in the fluoropolymer composition of the invention (e.g. not higher than 50,000, preferably not higher than 20,000, in number average molecular weight) is, the more remarkable is the improvement in cured material mechanical strength, among others, as compared with the case where the mixture disclosed in Japanese Kokai Publication H06-192524, for instance, is used.

The mechanisms by which the fluoropolymer composition of the invention produces such effects as mentioned above are not clear but can be thought to be as follows. Thus, in the case of the conventional fluoroelastomers, they have double bonds in the middle of the chain but not at either of the chain termini and the chain portions from a crosslinking site to the relevant chain terminus act as plasticizers, causing a problem, namely lowering the mechanical strength of the cured material. On the other hand, the fluoropolymer composition of the invention has crosslinking sites at chain termini and, therefore, presumably the cured material obtained can show improved mechanical strength and rubber elasticity, among others.

The fluoropolymer composition of the invention is further characterized in that it does not produce such byproducts as causing foaming during the curing type reaction and/or having toxicity. Owing to this characteristic feature, it becomes possible to carry out zero-pressure molding or low-pressure molding and, thus, carry out on-site or in-place laying, when a low-viscosity polymer is used as the methylene group-containing fluoropolymer (A).

The fluoropolymer composition of the invention may be in the form of a dispersion in an aqueous medium or a solution in an organic solvent according to need. The aqueous medium may be a mixture of water and an organic solvent.

The cured material characterized in that it is obtained from the above fluoropolymer composition also constitutes an aspect of the present invention. The cured material of the invention can show improved mechanical strength and other characteristics, as mentioned hereinabove.

The cured material of the invention may be, for example, one cured by the method described above concerning the fluoropolymer composition of the invention.

Preferred as the method of curing the fluorine-containing composition of the invention are the above-mentioned FIPG method and LIM method, among others.

The fluoropolymer composition of the invention, when dispersed in an aqueous medium or dissolved in an organic solvent, can be used as a coating agent. The coating agent comprising the fluoropolymer composition of the invention also constitutes an aspect of the present invention.

A layered article comprising a substrate and a coating layer obtained by coating the substrate with the coating agent mentioned above also constitutes an aspect of the present invention. The substrate is not particularly restricted but includes, among others, substrates made of an inorganic material such as a metal or ceramic or of an organic material such as a synthetic resin. As the coating method, there may be mentioned those methods of application which are known in the art.

A substrate-integrated molded material which is molded from the fluoropolymer composition of the invention on the substrate also constitutes an aspect of the present invention.

The substrate mentioned above is not particularly restricted but includes, among others, substrates made of an inorganic material such as a metal, for example aluminum, or a ceramic or of an organic material such as a synthetic resin. The substrate-integrated molded material may be one molded by the conventional application method or injection method but is preferably one molded by FIPG method or LIM molding method. The substrate-integrated molded material may also be one obtained by molding of the fluoropolymer composition on a substrate by the FIPG method, LIM molding method, known application method or injection molding method, for instance, followed by heating according to need for integration of the substrate with the material molded from the fluoropolymer composition.

The substrate-integrated molded material is preferably a packing material or the like, more preferably a packing material or the like molded on a substrate by FIPG method or LIM molding method, most preferably a gasket, from the moldability viewpoint. As more specific example of the packing or gasket, there may be mentioned those enumerated later herein.

Preferred as the method of molding the packing material or the like is, for example, the method comprising molding the fluoropolymer composition of the invention which comprises the methylene group-containing fluoropolymer (A) having fluidity at ordinary temperature by FIPG method or LIM molding method.

The cured material, layered article and substrate-integrated molded material of the invention are useful as various molded articles used, for example, in semiconductor-related, automotive, airplane, rocket, shipping, chemical, pharmaceutical, photographic, printing, coating/painting, analytical or physical or chemical apparatus, food plant, atomic power plant, iron and steel, general industry, electric, fuel cell, and electronic parts fields.

In the semiconductor-related fields, they can be used as O (or square) rings, packings, sealing materials, tubes, rolls, coatings, linings, gaskets, diaphragms, hoses and the like in semiconductor manufacturing equipment, liquid crystal panel manufacturing equipment, plasma panel manufacturing equipment, plasma address liquid crystal panel manufacturing equipment, organic EL panel manufacturing equipment, field emission display panel manufacturing equipment, solar cell substrate manufacturing equipment and so forth, and they can be used in CVD apparatus, dry etching apparatus, wet etching apparatus, oxidation dispersion apparatus, sputtering apparatus, ashing apparatus, cleaning apparatus, ion implantation apparatus, exhaust systems, piping for chemical liquids, and piping for gases. More specifically, they can be used as gate valve O rings/sealing materials, quartz winder O rings/sealing materials, chamber O rings/sealing materials, gate O rings/sealing materials, bell jar O rings/sealing materials, coupling O rings/sealing materials, pump O rings/sealing materials, diaphragms, semiconductor manufacturing gas controller O rings/sealing materials, resist developer/remover O rings/sealing materials, hoses/tubes for wafer cleaning solutions, wafer transportation rolls, resist developer vessel/remover vessel linings or coatings, wafer cleaning vessel linings or coatings, and wet etching vessel linings or coatings. Further, they are used as sealants or sealing agents, optical quartz coating materials, potting materials for insulation, vibro-isolation, waterproofing and/or moistureproofing of electronic device parts and circuit boards, coatings, adhesive seals, gaskets for magnetic memory devices, modifiers for such sealing materials as epoxy resins, clean room/clean equipment sealants and other clean equipment sealing materials.

In the automotive fields they can be used as or in gaskets, shaft seals, valve system seals, sealing materials, hoses, engines, peripheral equipment and so forth. The hoses and sealing materials can be used in the AT system, and the O (or square) rings, tubes, packings, valve core materials, hoses, sealing materials and diaphragms can be used in the fuel system and peripheral equipment. More specifically, they can be used as engine head gaskets, metal gaskets, oil pan gaskets, crankshaft seals, camshaft seals, valve stem seals, manifold packings, oil hoses, oxygen sensor seals, ATF hoses, injector O rings, injector packings, fuel pump O rings, diaphragms, fuel hoses, crankshaft seals, gearbox seals, power piston packings, cylinder liner seals, valve stem seals, automatic transmission front pump seals, rear axle pinion seals, universal joint gaskets, speedometer pinion seals, foot brake piston cups, torque transmission O rings, oil seals, exhaust gas recirculation combustion device seals, bearing seals, EGR tubes, twin carburetor tubes, carburetor sensor diaphragms, vibro-insulating rubbers (for engine mounts, exhaust systems), recirculation combustor hoses, and oxygen sensor bushes.

In the airplane, rocket and marine fields, mention may be made of diaphragms, O (square) rings, valves, tubes, packings, hoses and sealing materials, and these can be used in the fuel system. More specifically, they are used, in the airplane field, as jet engine valve stem seals, fuel feeding hoses, gaskets and O rings, rotating shaft seals, hydraulic instrument gaskets, and fire wall seals. In the marine field, they are used as screw propeller shaft stern seals, diesel engine air intake and exhaust valve stem seals, butterfly valve seals, and butterfly valve shaft seals.

In plants and other chemical fields, mention may be made of linings, valves, packings, rolls, hoses, diaphragms, O (square) rings, tubes, sealing materials and chemicalresistant coatings, and these can be used in the processes for producing drugs, agrochemicals, paints, resins and other chemicals. More specifically, they can be used as chemicals pumps, flowmeters and piping seals, heat exchanger seals, sulfuric acid plant glass cooler packings, agrochemical sprayer and agrochemical transfer pump seals, gas piping seals, plating bath seals, high-temperature vacuum drier packings, papermaking belt roller seals, fuel cell seals, wind tunnel joint seals, triclene-resistant rolls (for fiber/textile dyeing), acid-resistant hoses (for concentrated sulfuric acid), gas chromatograph and pH meter tube joint packings, chlorine gas transfer hoses, benzene and toluene reservoir rainwater drain hoses, analytical or physicochemical instrument seals, tubes, diaphragms and valve parts.

In the pharmaceutical field, they can be used as drug stoppers.

In the field of photography, including developing apparatus, in the field of printing, including printing machines, and in the field of painting/coating including coating equipment, mention may be made of rolls, which can be used in photographic film developing and X ray film developing apparatus, as printing rolls and as coating rolls, respectively. More specifically, they can be used as developing rolls in photographic film/X ray film developing apparatus, as printing roll gravure rolls and guide rolls, coating roll magnetic tape manufacture coating line gravure rolls, magnetic tape manufacture coating line guide rolls, and various coating rolls. Further, they can be used as dry copier seals, printing equipment printing rolls, scrapers, tubes and valve parts, coating/painting equipment coating rolls, scrapers, tubes and valve parts, printer ink tubes, rolls and belts, dry copier belts and rolls, and printer rolls and belts.

They can also be used in the form of tubes in analytical/physicochemical instrument fields.

In the food plant field, mention may be made of linings, valves, packings, rolls, hoses, diaphragms, O (square) rings, tubes, sealing materials and belts, and these can be used in food processing steps. More specifically, they can be used as plate type heat exchanger seals and vending machine solenoid valve seals.

In the atomic power plant equipment field, mention may be made of packings, O rings, hoses, sealing materials, diaphragms, valves, rolls and tubes.

In the iron and steel field, including iron plate processing equipment, mention may be made of rolls, which can be used as iron plate processing rolls.

In the general industry fields, mention may be made of packings, O rings, hoses, sealing materials, diaphragms, valves, rolls, tubes, linings, mandrels, electric wires, flexible joints, belts, rubber plates or sheets, weather strips, PPC copier rolls, roll blades, belts, etc. More specifically, they are used as hydraulic unit/lubricating device seals, bearing seals, dry cleaning unit windows and other seals, uranium hexafluoride concentrator seals, cyclotron sealing (vacuum) valves, automatic packaging machine seals, atmospheric sulfurous acid gas and/or chlorine gas analyzer pump diaphragms (in environmental pollution monitors), printing machine rolls and belts, and pickling squeezing rolls.

In the electric field, they are specifically used as Shinkansen (New Trunk Line) insulating oil caps, oil-sealed transformer benching seals, and oil well cable jackets.

In the fuel cell field, they are specifically used as electrode/separator sealing materials, and hydrogen/oxygen/formed water piping seals.

In the field of electronic parts, they are specifically used as heat radiator raw materials, electromagnetic wave shield raw materials, epoxy and like printed circuit board prepreg resin modifiers, scattering preventing materials for electric bulbs etc., and computer hard disk drive gaskets.

Those which can be used in on-site or in-place molding are not particularly restricted but include, among others, automotive engine metal gasket coating compositions, engine oil pan gaskets, copier/printer rolls, sealing compositions for building and construction, magnetic recorder gaskets, clean room filter unit sealing compositions, printed circuit board coating compositions, electric/electronic part fixers, electric appliance lead wire terminal insulation and moisture-proof treatment, electric furnace and other oven seals, sheath type heater terminal treatment, microwave range window frame seals, CRT wedge and neck adhesion, electrodeposition coated automotive part adhesion, and kitchen, bathroom, washroom and other joint seals.

In particular, the fluoropolymer composition of the invention is judiciously used as a magnetic recorder (hard disk drive) gasket manufacturing material, a sealing material for semiconductor manufacturing equipment and wafer or other device storehouses, a clean room filter unit sealing material or a like clean equipment sealing material by utilizing the cleanness of the methylene group-containing fluoropolymer (A).

The fluoropolymer composition of the invention is also judiciously used, in particular, as a sealing material for a fuel cell, for example a packing material for use between fuel cell electrodes and in peripheral piping, making the most of the characteristics thereof, for example chemical resistance, low gas permeability and flame retardancy.

BEST MODES FOR CARRYING OUT THE INVENTION

The following examples illustrate the present invention in further detail. These examples are, however, by no means limitative of the scope of the present invention.

PRODUCTION EXAMPLE

Cured Material Production

Step 1. Synthesis of $[(CH_3)_3COCH_2CF_2COO]_2$

A 100-ml three-necked flask was charged with 50 g of a 20% (by mass) aqueous solution of NaCl, and the contents were cooled to −15° C. Upon addition of 1.05 g of $Na_2O_2$, the temperature rose to −10° C. After cooling to −15° C. again, 4.91 g of $(CH_3)_3COCH_2CF_2COCl$ was added dropwise. After completion of the dropping, the mixture was stirred for 30 minutes with cooling at −15° C. Then, 5.0 ml of 1,1,2-trichloro-1,2,2-trifluoroethane cooled to −15° C. was added, followed by further 30 minutes of stirring. When allowed to stand, the mixture immediately separated into two layers. The lower white suspension layer was collected. Thus was obtained 6.0 ml of a solution.

The concentration of the title peroxide was determined by iodometric titration and found to be 134 mg/ml.

Step 2. Synthesis of a Methylene Group-containing Fluoropolymer

A 100-ml stainless steel reaction vessel was cooled to −50° C. and 4.6 ml of the peroxide solution in 1,1,2-trichloro-1,2,2-trifluoroethane as obtained in step 1 was added. After nitrogen gas substitution, 10.9 g of hexafluoropropylene and 6.5 g of vinylidene fluoride were charged into the vessel. The polymerization was carried out by shaking the stainless steel reaction vessel at 20° C. for 2.5 hours. The internal pressure of the stainless steel reaction vessel dropped from 1.28 MPa·G to 1.17 MPa·G. After completion of the polymerization, the unreacted monomers and 1,1,2-trichloro-1,1,2-trifluoroethane were evaporated to give 4.2 g of a liquid polymer (a).

Nuclear magnetic resonance [NMR] analysis revealed that the mole ratio between the vinylidene fluoride repeating units and hexafluoropropylene repeating units was 76.5:23.5.

To the liquid polymer (a) obtained was added the same mass of trifluoroacetic acid, and the mixture was heated at 70° C. for 2 hours. After the reaction, the mixture was washed with water and then dried to give 3.5 g of a liquid polymer (b). Analysis by NMR and infrared spectroscopic analysis [IR]

revealed that the tert-butoxy group at each terminus of the liquid polymer (a) had been converted to a hydroxyl group in the liquid polymer (b).

A 3.5-g portion of the liquid polymer (b) obtained was mixed with 1.0 g of allyl isocyanate $CH_2$=$CHCH_2NCO$, and the reaction was allowed to proceed at ordinary temperature for 24 hours, followed by heating to 100° C. to drive the reaction to completion. The excess allyl isocyanate was removed by evaporation while heating at 100° C. under reduced pressure to give a liquid polymer (c).

Analysis by NMR and IR revealed that the both main chain termini of the liquid polymer (c) each had an allyl group as a result of conversion from the hydroxyl group.

The liquid polymer (c) had fluidity at ordinary temperature.

The liquid polymer (c) had a number average molecular weight of 5400.

In determining the number average molecular weight, the liquid polymer (c) was dissolved in a solvent, a standard substance for quantitation was added, the allyl group concentration (mol/g) was determined by $^1$H-NMR, and the number average molecular weight $Mn^2$ was calculated using the following equation:

$$Mn^2=(1/(\text{allyl group concentration in liquid polymer (c)}))\times 2$$

The IR spectrum of the liquid polymer (c) was as follows: 1736 cm$^{-1}$ (C=O); 1650 cm$^{-1}$ ($H_2C$=CH—).

The $^1$H-NMR spectrum of the liquid polymer (c) was as follows (solvent: acetone-$d_6$, TMS standard): 5.7 to 5.8 ppm (1H), 4.9 to 5.1 ppm (2H), 3.6 to 3.7 ppm (4H).

Step 3. Cured Material Formation by a Curing Reaction

To 3.5 g of the liquid polymer (c) obtained was added 0.53 g of trimethylsilyl group-treated fumed silica with a surface area of 140 m$^2$/g (trademark: RX200; product of Nippon Aerosil Co., Ltd.). After 20 minutes of blending at 25° C., 0.0027 g of a toluene solution of a hydrosilylation catalyst prepared by modifying chloroplatinic acid with $CH_2$=CH—Si$(CH_3)_2$—O—Si$(CH_3)_2$—CH=$CH_2$ (platinum concentration 0.1% by weight), 0.0027 g of a 10% solution of 2-ethynylisopropanol in toluene and 0.121 g of methylhydrocyclosiloxane (trademark: SIM6510.0; product of AZmax Co.) were added, followed by 20 minutes of blending at 25° C. The mixture was degassed under reduced pressure, placed in a rectangular chase, again deaerated, and presscured at 150° C. for 60 minutes. The press curing gave a nonsticky cured material having rubber elasticity.

EXAMPLE 1

To 0.1 g of the liquid polymer (c) heat-treated at 180° C. for 7 hours were added 0.0157 g of a methylhydrosiloxane/dimethylsiloxane copolymer (trademark: HMS-301, product of Gelest, Inc.; molecular weight 1900 to 2000, methylhydrosiloxane content 25 to 30% by mass of the copolymer) and 0.0080 g of a 0.06% platinum catalyst solution in toluene [prepared by 200-fold dilution of PT-VTSC-12.0VTS (trademark, product of OMG Precious Metals Japan Co., Ltd.) with toluene], and the mixture was stirred at 50° C. for 2 hours to give a liquid polymer composition (i). This liquid polymer composition (i) was sticky.

The liquid polymer composition (i) was sandwiched between two fluororesin films, and the thus-formed sheet was then heated at 150° C. for 1 hour. This heating gave a nonsticky cured material. The cured material obtained was immersed in acetone and it was confirmed that the material was not dissolved but maintained the sheet form. IR measurement of this cured material revealed that the IR absorption at 1650 cm$^{-1}$ observed with the liquid polymer (c) was hardly detected, indicating the contribution of the terminal allyl groups of the liquid polymer (c) to the formation of the cured material through the hydrosilylation reaction.

EXAMPLE 2

An acetone solution (also referred to as "coating composition") of the liquid polymer composition (i) was prepared by dissolving 0.1 g of the liquid polymer (c) heat-treated at 180° C. for 7 hours, 0.0157 g of a methylhydrosiloxane/dimethylsiloxane copolymer [trademark: HMS-301, product of Gelest, Inc.; molecular weight 1900 to 2000, methylhydrosiloxane content 25 to 30% by mass of the copolymer) and 0.0080 g of a 0.06% platinum catalyst solution in toluene [prepared by 200-fold dilution of PT-VTSC-12.0VTS (trademark, product of OMG Precious Metals Japan Co., Ltd.) with toluene] in 1.0 g of acetone.

The acetone solution of the liquid polymer composition (i) was transferred to a glass dish and heated at 150° C. for 1 hour to give a sheet-like cured material. The solvents acetone and toluene evaporated during the heating. The cured material obtained had elasticity but the stickiness found with the liquid polymer (c) was no more found. The IR spectrum of the cured material obtained showed no absorption at 1650 cm$^{-1}$, and it was thus confirmed that the main chain terminal unsaturated groups of the liquid polymer (c) had reacted with the methylhydrosiloxane/dimethylsiloxane copolymer.

EXAMPLE 3

The acetone solution (coating composition) of the liquid polymer composition (i) as obtained in Example 2 was applied to an aluminum sheet surface-treated by blasting, and the whole was heated at 50° C. at atmospheric pressure for 5 hours to evaporate the solvent from the solution, then heated at 100° C. for 3 minutes and further heated at 150° C. for 3 hours to give a layered article having the coating layer of the fluorine-containing copolymer on the surface.

EXAMPLE 4

A liquid polymer composition (ii) in the form of an acetone solution was prepared by dissolving 0.1 g of the liquid polymer (c) heat-treated at 180° C. for 7 hours, 2.0 g of 1,1,3,3-tetramethyldisiloxne and 0.0080 g of a 0.06% platinum catalyst solution in toluene [prepared by 200-fold dilution of PT-VTSC-12.0VTS (trademark, product of OMG Precious Metals Japan Co., Ltd.) with toluene] in 1.0 g of acetone.

The acetone solution of the liquid polymer composition (ii) was transferred to a glass dish and heated at 150° C. for 1 hour to give 0.1 g of a liquid polymer (d). The solvents acetone and toluene and the excess 1,1,3,3-tetramethyldisiloxane evaporated during the heating. The liquid polymer (d) obtained flowed at ordinary temperature but the IR spectrum thereof showed no absorption at 1650 cm$^{-1}$, and it was thus confirmed that the both main chain termini each had been converted to an Si—H group in the liquid polymer (d).

EXAMPLE 5

A liquid polymer composition (iii) in the form of an acetone solution was prepared by mixing up 0.1 g of the liquid polymer (d), 0.004 g of triallyl isocyanurate, 0.0080 g of the 0.06% platinum catalyst solution in toluene, and 1.0 g of acetone.

The liquid polymer composition (iii) in acetone solution form was transferred to a glass dish and heated at 150° C. for 1 hour to give a sheet-like cured material. The solvents acetone and toluene evaporated during the heating. The cured material obtained had elasticity but the stickiness found with the liquid polymer (d) was no more found.

EXAMPLE 6

A 10-ml syringe of a dispenser (trademark: Digital Controlled Dispenser ML-606GX, product of Musashino Engineering, Inc.) was filled with the liquid polymer composition (i) obtained in Example 1. This syringe was heated to 50° C. and, using the above dispenser, a metallic substrate for personal computer hard disk drive preparation was coated with the liquid polymer composition (i) by FIPG method.

The liquid polymer composition (i) applied was cured by heating at 150° C. for 1 hour to give a metal substrate-integrated gasket for hard disk drive production which had a seal layer of the cured fluoropolymer on the metal substrate.

Industrial Applicability

The fluoropolymer composition of the invention, which has the constitution described hereinabove, can give cured materials improved in mechanical strength.

The invention claimed is:

1. A methylene group-containing fluoropolymer which is selected from the group consisting of vinylidene fluoride-based copolymer (I), tetrafluoroethylene-propylene-based copolymer (II) and hexafluoropropylene-ethylene-based copolymer (III),
   wherein each of both main chain termini is a Si—H group, and the number average molecular weight of said methylene group-containing fluoropolymer is 2000 to 500000.

* * * * *